(12) United States Patent
Mueller et al.

(10) Patent No.: US 8,560,754 B2
(45) Date of Patent: Oct. 15, 2013

(54) FULLY INTEGRATED, LOW AREA UNIVERSAL SERIAL BUS DEVICE TRANSCEIVER

(75) Inventors: Brian K. Mueller, Fort Collins, CO (US); Eric I. Carpenter, Fort Collins, CO (US); Dustin R. Steffenson, Fort Collins, CO (US); Jeffrey J. Odor, Alburtis, PA (US)

(73) Assignee: LSI Corporation, San Jose, CA (US)

( * ) Notice: Subject to any disclaimer, the term of this patent is extended or adjusted under 35 U.S.C. 154(b) by 306 days.

(21) Appl. No.: 12/884,460

(22) Filed: Sep. 17, 2010

(65) Prior Publication Data

US 2012/0072634 A1 Mar. 22, 2012

(51) Int. Cl.
*G06F 13/20* (2006.01)
(52) U.S. Cl.
USPC .......................................... 710/313; 710/305
(58) Field of Classification Search
USPC .................................................. 710/313, 305
See application file for complete search history.

(56) References Cited

U.S. PATENT DOCUMENTS

| 7,176,720 B1 * | 2/2007 | Prather et al. .................. 326/80 |
| 7,552,258 B2 | 6/2009 | Turner et al. |
| 7,640,378 B2 | 12/2009 | McLeod |
| 7,685,340 B1 | 3/2010 | Gaither |
| 7,761,630 B2 | 7/2010 | Henning et al. |
| 8,062,068 B2 * | 11/2011 | Sidiki et al. .............. 439/620.08 |
| 8,116,149 B2 * | 2/2012 | Chen et al. ................ 365/189.15 |
| 8,144,967 B2 * | 3/2012 | Kawashima .................. 382/141 |
| 8,166,222 B2 * | 4/2012 | Garlapati et al. ............. 710/106 |
| 2009/0248930 A1 | 10/2009 | Garlapati et al. |
| 2010/0022138 A1 | 1/2010 | Miyoshi et al. |
| 2010/0159745 A1 | 6/2010 | Wan et al. |
| 2012/0060045 A1 * | 3/2012 | Foster ........................... 713/400 |

FOREIGN PATENT DOCUMENTS

WO   WO 2010/017636 A1   2/2010

OTHER PUBLICATIONS

"Chipidea and SST Offer Integrated USB 2.0 and USB 2.0 OTG IP Solutions for Chartered's 0.13-Micron and 0.18-Micron Processes," SOCcentral (2005) Mar. 8, http://www.soccentral.com/PrintPage.asp?PassedEntryID=12170.
McCorquodale, M. S. et al., "A Monolithic and Self-Referenced RF LC Clock Generator Compliant With USB 2.0" *IEEE Journal of Solid-State Circuits* (2007) 42(2):385-399.
"Universal Serial Bus Specification", Revision 2.0, Apr. 27, 2000, published by Compaq Computer Corporation et al. Retrieved from http://www.usb.org/developers/docs/.
"Universal Serial Bus 3.0 Specification", Revision 1.0, Nov. 12, 2008, published by Hewlett-Packard et al. Retrieved from http://www.usb.org.developers/docs/.

* cited by examiner

*Primary Examiner* — Clifford Knoll
(74) *Attorney, Agent, or Firm* — Kermit D. Lopez; Luis M. Ortiz; Ortiz & Lopez, PLLC

(57) ABSTRACT

A transceiver apparatus includes a process, a first type of transceiver circuit for data transmission, a second type of transceiver circuit for data transmission, and a communications interface for communicating between the first type of transceiver circuit and an external device. The first type of transceiver circuit is co-located with a physical layer associated with the first type of transceiver circuit. In some embodiments, the first type of transceiver circuit can be, for example, a USB 2.0 transceiver circuit, and the second type of transceiver circuit can be a USB 3.0 transceiver circuit. The aforementioned external device can be an external USB device.

15 Claims, 4 Drawing Sheets

FULLY INTEGRATED, LOW AREA UNIVERSAL SERIAL BUS DEVICE TRANSCEIVER

TECHNICAL FIELD

Embodiments are generally related to communications via a Universal Serial Bus (USB). Embodiments are further related to the integration of USB 2.0 peripherals with USB 3.0 specifications. Embodiments are additionally related to integrating a USB 2.0 transceiver on the same system-on-chip (SOC) as a USB 3.0 physical layer (PHY).

BACKGROUND OF THE INVENTION

Universal Serial Bus (USB) technology allows numerous peripheral devices to be connected to computing devices in a plug-and-play fashion. Such devices include, for example, keyboards, speakers, cameras, joysticks, mice, hard drives, flash drives, DVD drives, and various transceivers. Current peripheral devices are designed and implemented as defined by the *Universal Serial Bus* 2.0 *Specifications, Revision* 2.0, which is herein incorporated by reference in its entirety. Users now expect a high level of performance from USB devices. These peripheral devices require ever-increasing bus bandwidth. Therefore, USB technology is evolving from USB 2.0 "High-Speed" to USB 3.0 "SuperSpeed".

The *Universal Serial Bus* 3.0 *Specifications, Revision* 1.0, which is also herein incorporated by reference in its entirety, define a number of criteria to be met in order to comply with the USB 3.0 Specifications. USB 3.0 improves on USB 2.0 by improving power management while leveraging existing USB infrastructure. USB 3.0 is a physical SuperSpeed bus combined in parallel with a physical USB 2.0 bus. It has similar architectural components as USB 2.0, including USB 3.0 interconnect, USB 3.0 devices, and USB 3.0 host. The USB interconnect is the manner in which USB 3.0 and USB 2.0 devices connect to and communicate with the USB 3.0 host. The USB 3.0 interconnect inherits core architectural elements from USB 2.0, although several are modified to accommodate the dual bus architecture. Modifications in USB 3.0 include eight primary conductors: three twisted signal pairs for USB data paths and a power pair. One of the twisted signal pairs accommodates for USB 2.0 data path, while two of the twisted signal pairs are used to provide USB 3.0 data paths, one for the transmit path and one for the receive path. In all, USB 3.0 inherits the Vbus, D+, D−, and GND wires from USB 2.0, and incorporates VDD33 conductors to accommodate for SuperSpeed interfaces. USB 3.0 accommodates forwards and backwards-compatibility with existing USB 2.0 peripherals at a lower speed using a Type-A connector.

While USB technology evolves towards the USB 3.0 standard, many current computing devices and peripherals only support USB 2.0. One such peripheral includes a transceiver. 40-nm FPGA's and ASCI's with transceivers have higher integration than prior nodes, including the 65-nm and 45-nm nodes. Another performance benefit of the 40-nm process includes shorter minimum transistor gate lengths than the 45-nm process. Further, power consumption is reduced in the 40-nm node, as smaller process geometries reduce parasitic capacitances. Therefore a need exists for integrating a USB 2.0 transceiver on the same SOC as a USB 3.0 PHY without incurring excess area or system costs.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for improved data communications over a Universal Serial Bus (USB).

It is another aspect of the disclosed embodiments to provide for integrating USB 2.0 peripherals with USB 3.0 specifications.

It is another aspect of the disclosed embodiments to provide for integrating a USB 2.0 transceiver on the same SOC as a USB 3.0 PHY.

The above and other aspects of the invention can now be achieved as will now be briefly described. A transceiver apparatus is disclosed, which includes a process, a first type of transceiver circuit for data transmission, a second type of transceiver circuit for data transmission, and a communications interface for communicating between the first type of transceiver circuit and an external device. The first type of transceiver circuit is co-located with a physical layer associated with the first type of transceiver circuit. In some embodiments, the first type of transceiver circuit can be, for example, a USB 2.0 transceiver circuit, and the second type of transceiver circuit can be a USB 3.0 transceiver circuit. The aforementioned external device can be an external USB device.

In general, the disclosed embodiments include a fully integrated 40 nm transceiver that integrates a USB 2.0 transceiver on the same SOC as a USB 3.0 PHY. Embedded I/O pads and associated I/O circuitry can be incorporated within a transceiver cell as an improve I/O solution. Standard core and 1.8V I/O transceiver devices are integrated with USB 2.0 input/output (I/O) pads (D+, D−, VDD33, GND, and VBUS). Associated electrostatic discharge (EDS) structures with 5V tolerant I/O pads are integrated within the transceiver architecture. Use of an SOC clock and bias generation IP is optimized, along with a high-speed (HS) clock and data recovery capabilities for a very low area, low power USB 2.0 solution.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
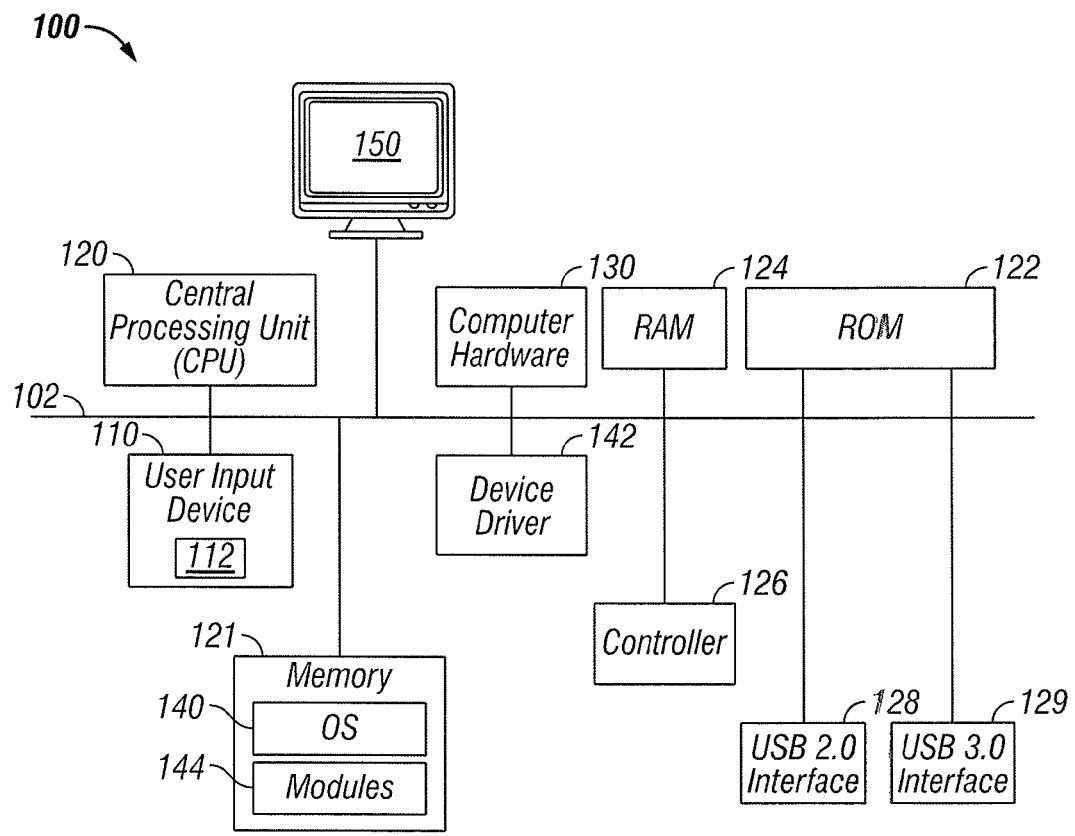
FIG. 1 illustrates a block diagram of a sample data-processing apparatus, which can be utilized for hosting a USB transceiver, in accordance with the disclosed embodiments.

FIG. 1 illustrates a block diagram of a sample data-processing apparatus for hosting a USB transceiver, in accordance with the disclosed embodiments. Data processing apparatus 100 of FIG. 1 generally includes a user input device 110, a central processing unit 120, computer hardware 130, and a monitor 150. The user input device 110 can be coupled to the central processing unit 120 wherein the central processing unit 120 is coupled to the computer hardware 130 and the operating system 140. User input device 110 can be implemented, for example, as a computer keyboard, a computer mouse, and so forth.

The central processing unit 120 is connected to a bus 102, which in turn can be connected to other system components, such as memory 121, Random Access Memory (RAM) 124, Read Only Memory (ROM) 124, a controller 126, and an USB 2.0 interface 128 or a USB 3.0 interface 129. Note that controller 126 can be implemented as one or more controller types. System bus 102 can also be connected to other components of data processing apparatus 100, such as, for example, monitor 150, device driver 142 and user input device 110. The USB 2.0 interface 128 and USB 3.0 interface 129 are generally associated with operating system 140. Memory 121, which is coupled to bus 102, can communicate with the central processing unit 120 via bus 102. Operating system (OS) 140 can be stored as a module or series of software modules within memory 121 and processed via CPU 120. Note the term "module" is defied in greater detail herein.

The device driver 142 can be implemented as a software or instruction module stored in a memory, such as memory 121, which can be utilized to communicate with the controller 126. Thus, although device driver 142 is illustrated in FIG. 1 as a separate "block," it can be appreciated that device driver 142 can be implemented in the context of a module storable in a computer memory. Device driver 142 generally functions as a module or group of modules that communicates between OS 140 and the controllers described herein. Similarly, USB 2.0 interface 128 and USB 3.0 interface 129, which are also depicted in FIG. 1 as constituting a separate "block", can form a part of OS 140 to allow for direct communication such as sending messages to and from device driver 142.

The operating system 140 is the master control program that runs the computer. It sets the standards for all application programs that run in the computer. Operating system 140 can be implemented as the software that controls the allocation and usage of hardware resources, such as memory 121, central processing unit 120, disk space, and other peripheral devices, such as monitor 150, user input device 110 and computer hardware 130. Examples of operating systems, which may be utilized to implement operating system 140 of apparatus 100, include Windows, Mac OS, UNIX and Linux.

Bus 102 can be implemented as a plurality of conducting hardware lines for data transfer among the various system components to which bus 102 is attached. Bus 102 functions as a shared resource that connects varying portions of data-processing apparatus 100, including the CPU 120 (i.e., a microprocessor), controllers, memory and input/output ports and so forth and enabling the transfer of information. Bus 102 can be configured into particular bus components for carrying particular types of information. For example, bus 102 can be implemented to include a group of conducting hardware lines for carrying memory addresses or memory locations where data items can be found, while another group of conducting hardware lines can be dedicated to carrying control signals, and the like.

The user input device 110 can include a plurality of device descriptor files 112. The device descriptor files 112 contain information related to the user input device, e.g. what type of device it is, who made the device, etc. The device descriptor files 112 can also contain user-defined fields called report descriptors. Report descriptors are strings of information that the operating system 140 can read. Report descriptors can be implemented, for example, as for passing useful information about the user input device 110 to the operating system 140 and/or a device driver 142. Such report descriptors are unique for each type of user input device.

Note that embodiments of the present invention can be implemented in the context of modules. Such modules may constitute hardware modules, such as, for example, electronic components of a computer system. Such modules may also constitute software modules. In the computer programming arts, a software module can be typically implemented as a collection of routines and data structures that performs particular tasks or implements a particular abstract data type.

Software modules generally are composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

Figure 2:
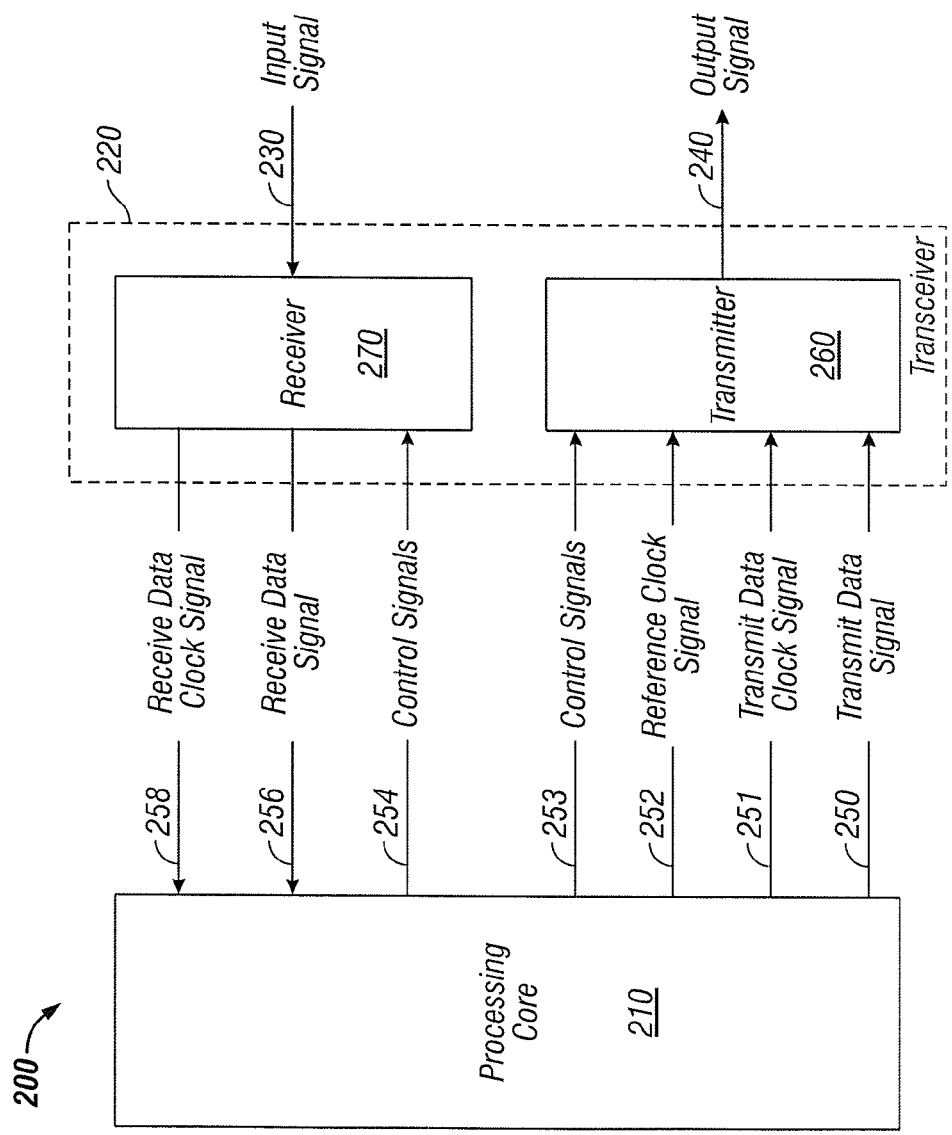
FIG. 2 illustrates a block diagram of a USB transceiver device, in accordance with the disclosed embodiments.

FIG. 2 illustrates a block diagram of a USB transceiver device system, in accordance with the disclosed embodiments. The USB transceiver is preferably embodied as a 40-nm transceiver. It is understood that a 40-nm USB transceiver is used for illustrative purposes only and that numerous varieties of transceivers can be integrated with USB 2.0 and USB 3.0 features as disclosed herein. The USB 2.0 specification includes 3.3V full-speed and 5V Vbus signaling directly on the SOC/ASIC (system-on-chip/application-specific integrated circuit). The SOC/ASIC can be restricted to using 1.8V I/O devices in an exemplary technology process flow. To further describe the numerous features of USB 2.0 devices, The *Universal Serial Bus Specification Revision* 2.0, Apr. 27, 2000, which describes the USB 2.0 protocol in detail, is available on-line at http://www.usb.org/developers/doc and incorporated herein by reference in its entirety. To describe the additional features of USB 3.0, the *Universal Serial Bus Specification Revision* 3.0, Nov. 12, 2008, which describes the USB 3.0 protocol in detail, is available on-line at http://www.usb.org/developers/doc and incorporated herein by reference in its entirety.

The transceiver device system 200 is comprised of a processing core 210 and a USB transceiver 220 having a transmitter 260 and a receiver 270. The USB transceiver 220 comprises an integrated USB 2.0 transceiver on the same SOC as a USB 3.0 PHY without incurring excess area or system costs. The USB transceiver 220 can interconnect with USB 2.0 interface 128, or USB 3.0 interface 129, as illustrated in FIG. 1. A number of signals are provided to and from the transmitter 260 and receiver 270. A receiver 270 receives an input signal 230, which is processed by USB 2.0 transceiver 220 and passed to processing core 210, such as, for example an field programmable gate array (FPGA) core or application-specific integrated circuit (ASIC) core. Signals received by the receiver 270 may include control signals 254. Signals sent by receiver 270 to the processing core 210 may include receive data signal 256, and a receive data clock signal 258. Receiver 270 provides receive data signal 256 and receive data clock signal 258 to processing core 210, and thus presents a digitized, synchronized representation of the received data stream, or input signal 230, to processing core 210. The configuration and operation of receiver 270 is controlled by processing core 210. Processing core 210 controls receiver 270 via control signals 254. Transmitter 260 receives signals from processing core 210. These signals may include a transmit data signal 250 and a transmit data clock 251, as well as a reference clock 252 and control signals 253. USB transceiver 220 then generates an output signal 240 from signals received from processing core 210.

Processing core 210 provides the data to be transmitted, as well as its associated clock signal, to transmitter 260 via transmit data signal 250 and transmit data clock signal 251, respectively. Reference clock signal 252 is sent to the clock multiplier unit of transmitter 260, which multiplies the frequency of reference clock signal 252 under the control of control signals 253, resulting in a high-speed clock that is used to transmit the data from transmitter 260. A clock signal is optimized preferably as a system-on-chip (SOC) clock using bias generation IP, and an integrated high speed (HS) clock and data recovery for a very low area, low power USB 2.0 solution. The clock can comprise a self-referenced radio frequency (RF) LC clock generator (not shown) that is compliant with USB 2.0 and USB 3.0. The clock both maintains high frequency accuracy and low jitter. The clock can also comprise a 12 MHz or 13 MHz trimmable internal precision oscillator or an external crystal controlled oscillator circuit (neither shown). A multiplexer can also be provided and is operable to select among multiple clocks.

Figure 3:
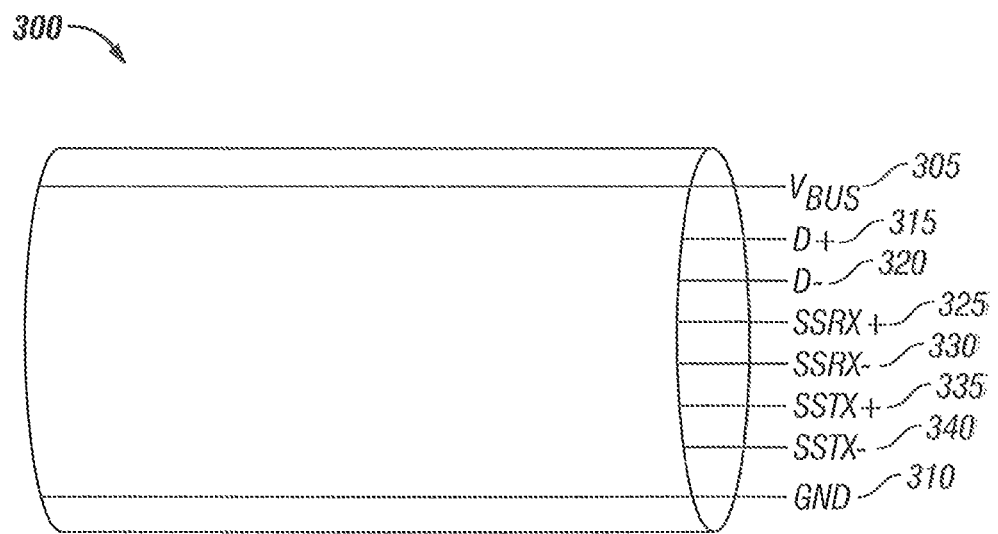
FIG. 3 illustrates a simplified diagram of the electrical configuration of an example USB 3.0 cable, in accordance with the disclosed embodiments.

The disclosed 40 nm USB transceiver may conform to the requirements of USB 2.0 and to the requirements of USB 3.0, and be may implemented in a single cable that conforms to the requirements of USB 3.0. Further, it is understood that the USB 2.0 design disclosed herein is capable of providing a unique stand-alone (USB 2.0 PHY only) solution integrated into an SOC/ASIC in any technology where the application is limited to 1.8V input/output (I/O) devices. FIG. 3 illustrates a simplified diagram of the electrical configuration of an example USB 3.0 cable 300. USB 3.0 cable 300 includes eight lines: a voltage line (Vbus) 305, a ground line (GND) 310, a data plus (DP) signaling line 315, a data minus (DM) signaling line 320, a SuperSpeed receiver plus (SSRX+) line 325, a SuperSpeed receiver minus (SSRX−) line 330, a SuperSpeed transmitter plus (SSTX+) line 335, and a SuperSpeed transmitter minus (SSTX−) line 325. The Vbus 305, D+ 315, D− 320, and GND 310 lines are the same lines specified in USB 2.0 and provides backwards and forwards compatibility for USB 2.0 devices and peripherals. The USB 3.0 single cable can be, for example, a USB 3.0 Standard-A Connector that has the same mating interface as the USB 2.0 Standard-A Connector, but with additional pins for two more differential pairs and a drain. An exemplary USB 3.0 connector is described in U.S. Patent Application Publication No. 2010/0159745, entitled "Receptacle Connector," filed Feb. 2, 2007, which is incorporated by reference herein in its entirety.

Figure 4:
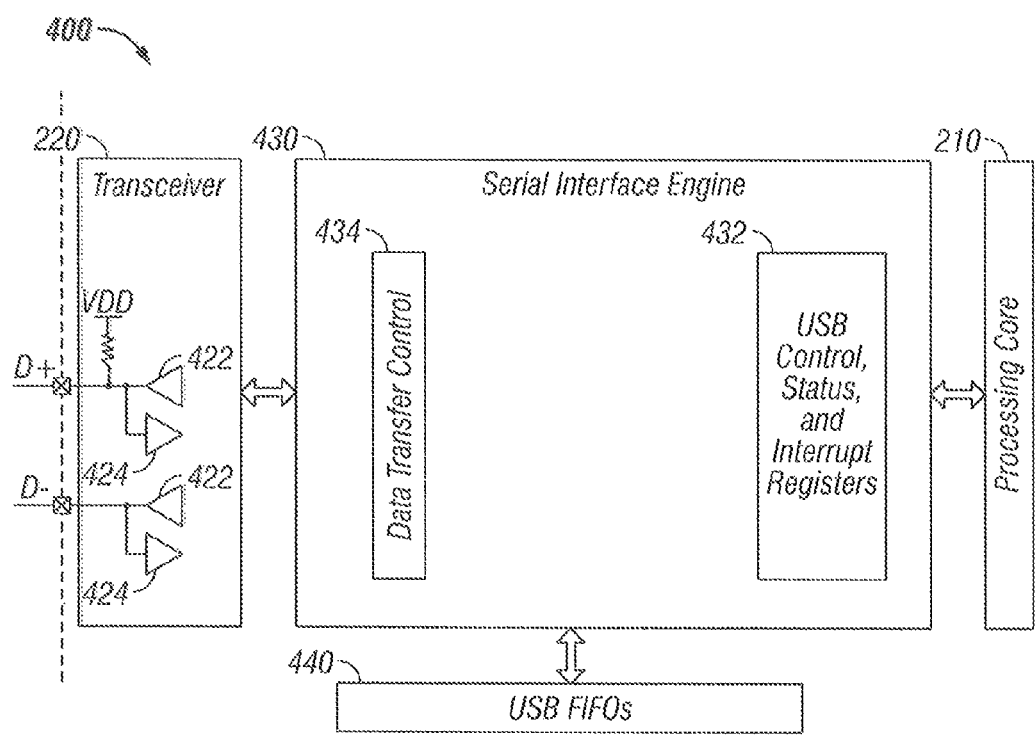
FIG. 4 illustrates a block diagram of USB transceiver device circuit, in accordance with the disclosed embodiments.

FIG. 4 illustrates a block diagram of a USB 2.0 transceiver device circuit 400, in accordance with the disclosed embodiments. The USB 2.0 transceiver device circuit 400 includes the transceiver circuit 220, the USB function controller comprising a serial interface engine 430 which interconnects with the transceiver 220, and the processing core 210. The transceiver circuit 220 includes driver circuits 422 connected to each of the D+ 315 and D− 320 pins and receive buffers 424 also connected to each of the D+ 315 and D− pins 320. USB 3.0 transceiver circuit including SSRX+ 325, SSRX− 330, SSTX+ 335, SSTX− 340, along with associated electrostatic devices can be integrated within the transceiver 220. USB 2.0 transceiver 220 also receives and sends signals via a Vbus 305. The serial interface engine 430 performs all low level USB protocol tasks, interrupting the processor 210 when data has successfully been transmitted or received. The serial interface engine 430 interconnects with the USB FIFO memory 340. Operation of the serial interface engine 430 is controlled via a number of USB control status and interrupt registers 432. Information is passed on to the transceiver circuit 220 via the data transfer control 434.

It will be appreciated that variations of the above-disclosed and other features and functions, or alternatives thereof, may be desirably combined into many other different systems or applications. Furthermore, various presently unforeseen or unanticipated alternatives, modifications, variations or improvements therein may be subsequently made by those skilled in the art which are also intended to be encompassed by the following claims.

What is claimed is:

1. A fully integrated 1.8 V I/O 40-nm transceiver apparatus, comprising:
   a processor;
   a first type of transceiver circuit for data transmission, said first type of transceiver circuit comprising a USB 2.0 transceiver;
   a second type of transceiver circuit for data transmission, said second type of transceiver circuit comprising a USB 3.0 transceiver; and
   a communications interface for communicating between said first type of transceiver circuit and an external device, said first type of transceiver circuit co-located with a physical layer associated with said first type of transceiver circuit, wherein said communications interface supports forwards and backwards compatibility.

2. The apparatus of claim 1 wherein said external device comprises an external USB device.

3. The apparatus of claim 1 wherein said USB 2.0 transceiver comprises a 40-nm transceiver.

4. The apparatus of claim 1 wherein said USB 2.0 transceiver comprises a standard core transceiver device.

5. The apparatus of claim 1 wherein said transceiver apparatus integrates electrostatic discharge structures with input/output pads.

6. The apparatus of claim 1 wherein said transceiver apparatus further comprises a system-on-chip clock and bias generation for low jitter of said transceiver, and a high-speed clock and data recovery capabilities.

7. The apparatus of claim 1 wherein said transceiver apparatus further comprises embedded input/output pads and associated input/output circuitry incorporated within said transceiver.

8. A 1.8 V I/O 40-nm transceiver system, comprising:
   a processor;
   a first type of transceiver circuit for data transmission, said first type of transceiver circuit comprising a USB 2.0 transceiver;
   a second type of transceiver circuit for data transmission, said second type of transceiver circuit comprising a USB 3.0 transceiver;
   a communications interface for communicating between said first type of transceiver circuit and an external device, said first type of transceiver circuit co-located with a physical layer associated with said first type of transceiver circuit, wherein said communications interface supports forwards and backwards compatibility.

9. The system of claim 8 wherein said external device comprises an external USB device.

10. The system of claim 8 wherein said USB 2.0 transceiver comprises a 40-nm transceiver.

11. The system of claim 8 wherein said USB 2.0 transceiver comprises a standard core transceiver device.

12. The system of claim 8 wherein said transceiver apparatus integrates electrostatic discharge structures with input/output pads.

13. The system of claim 8 wherein said transceiver apparatus further comprises a system-on-chip clock and bias generation for low jitter of said transceiver, and a high-speed clock and data recovery capabilities.

14. The system of claim 8 wherein said transceiver apparatus further comprises embedded input/output pads and associated input/output circuitry incorporated within said transceiver.

15. A fully-integrated 1.8 V I/O 40-nm transceiver apparatus, comprising:
   a processor;
   a first type of transceiver circuit for data transmission, said first type of transceiver circuit comprising a USB 2.0 transceiver;
   a second type of transceiver circuit for data transmission, said second type of transceiver circuit comprising a USB 3.0 transceiver;
   a communications interface for communicating between said first type of transceiver circuit and an external device, said first type of transceiver circuit co-located with a physical layer associated with said first type of transceiver circuit, wherein said communications interface supports forwards and backwards compatibility;
   a USB 2.0 physical layer integrated with a system on chip or application-specific integrated circuit within said transceiver apparatus; and
   an SOC clock and bias generation IP, and an integrated HS clock and data recovery within said transceiver apparatus for a low area and low power USB 2.0 solution.

\* \* \* \* \*